US005376903A

United States Patent [19]

Kantorowicz

[11] Patent Number: 5,376,903

[45] Date of Patent: Dec. 27, 1994

[54] METHOD FOR THE COMPRESSION OF PULSES, NOTABLY IN MICROWAVE TRANSMISSION

[75] Inventor: Gérard Kantorowicz, Paris, France

[73] Assignee: Thomson-CSF, Puteaux, France

[21] Appl. No.: 64,441

[22] Filed: May 21, 1993

[30] Foreign Application Priority Data

May 26, 1992 [FR] France ............................... 92 06431

[51] Int. Cl.[5] ............................................... H04B 3/00

[52] U.S. Cl. ....................................... 333/20; 333/156; 333/248

[58] Field of Search ................. 333/20, 156, 157, 208, 333/248; 328/65

[56] References Cited

U.S. PATENT DOCUMENTS

| | | | |
|---|---|---|---|
| 2,863,126 | 12/1958 | Pierce . | |
| 3,243,735 | 3/1966 | Gross . | |
| 3,277,403 | 10/1966 | Cohn . | |
| 3,982,215 | 9/1976 | Lo et al. . | |
| 4,864,258 | 9/1989 | Garrer et al. | 333/20 |

FOREIGN PATENT DOCUMENTS 0706716 4/1954 United Kingdom .

OTHER PUBLICATIONS

F. Ishihara, et al., Review of the Electrial Communication Laboratories, Comb Type 4GHz Delay Equalizer for Millimeter Wave Communication, vol. 18, No. 3–4, Apr. 1970, pp. 245–258.

P. J. B. Clarricoats, et al., Electronics Letters, Proposed Microwave Delay Lines for Pulse-Compression Radar, vol. 1, No. 6, Jul. 1965, pp. 175–176.

*Primary Examiner*—Robert J. Pascal
*Assistant Examiner*—Darius Gambino
*Attorney, Agent, or Firm*—Oblon, Spivak, McClelland, Maier & Neustadt

[57] ABSTRACT

In a pulse compression device, the pulses to be compressed being frequency modulated, the device comprises at least one transmission line, the cut-off frequency of which varies along its axis of propagation and means for the separation of an incident wave and a reflected wave, loaded by the transmission line and receiving the pulses to be compressed which get reflected along the transmission line, the variation of the cut-off frequency and the frequency modulation of the pulses being matched with each other. Application: high power pulse compression in microwave transmission. FIG. 3*a*.

9 Claims, 5 Drawing Sheets

METHOD FOR THE COMPRESSION OF PULSES, NOTABLY IN MICROWAVE TRANSMISSION

BACKGROUND OF THE INVENTION

The present invention relates to a method for the compression of pulses, notably in microwave transmission.

It can be applied notably to radars for the detection of furtive or stealthy targets. More generally, it can be applied to all radars whose function requires the transmission of high peak power during very brief pulses.

To combat stealthy targets for example, it is necessary to send out pulses that have a shorter duration than the reaction times of these stealthy targets, which are themselves very brief. It is then necessary, for example, to compress the pulses sent by a ratio of about 10, at constant mean transmitted power. This may lead to the compression, for example, of pulses with a duration of 100 ns at 1 MW peak power into pulses with a duration of about 10 ns at 10 MW peak power.

The analog compression of frequency modulated pulses is a well known technique used at reception. Compression at transmission and at high levels of power has already been achieved. One device has notably been described in the article by Z. D. Farkas, H. A. Hogg, G. A. Loew and P. B. Wilson, "SLED: A Method Of Doubling SLAC's Energy", Stanford Linear Accelerator Center, Stanford University, 1974. The device described uses the time taken for the filling of a resonant cavity as the delay between the front edge of the pulse and the rear edge. This method is limited by the overvoltages due to the resonance, by the losses in the cavity and by the strong electrical fields proportional to the overvoltage of the cavity.

Owing to the limited gain of this structure, another device called a "Binary Power Compressor" has been designed. This device is described in the article by Z. Farkas, "Binary Peak Power Multiplier And Its Application To Linear Accelerator Design", IEEE Trans MTT 34—1986, page 1036. It uses two parallel amplification channels, one of the channels being delayed with respect to the other one before their recombination in phase and before the reduction, by a factor of two, of the pulse duration.

To achieve a substantial reduction in the duration of the pulses, it is therefore necessary to use a large number of sections of this type, which complicates the device and makes it bulky and costly.

SUMMARY OF THE INVENTION

The invention is aimed at overcoming the above-mentioned drawbacks, notably by making it possible to compress pulses to a substantial extent with high possible levels of peak power.

To this end, an object of the invention is a pulse compression device, the pulses being modulated in frequency, wherein said device comprises at least one transmission line with a cut-off frequency that varies along its axis of propagation, a non-transmitted signal being reflected, and means for the separation of an incident wave and a reflected wave, loaded by the transmission line, and for and receiving the pulses to be compressed which get reflected along the transmission line, the variation of the cut-off frequency and the frequency modulation of the pulses to be compressed being matched with each other.

The chief advantages of the invention are that it is compact and easy to use, and that it enables high compression rates.

BRIEF DESCRIPTION OF THE DRAWINGS

Other features and advantages of the invention shall appear from the following description, made with reference to the appended drawings, of which.

DESCRIPTION OF THE INVENTION

Figure 1A:
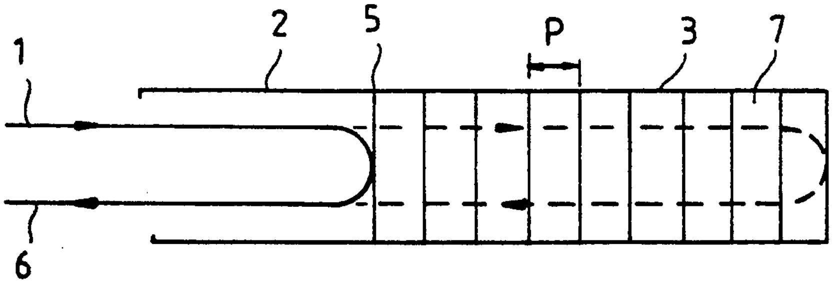
FIG. 1*a* is a basic drawing showing the working of a device according to the invention.
Figure 1B:
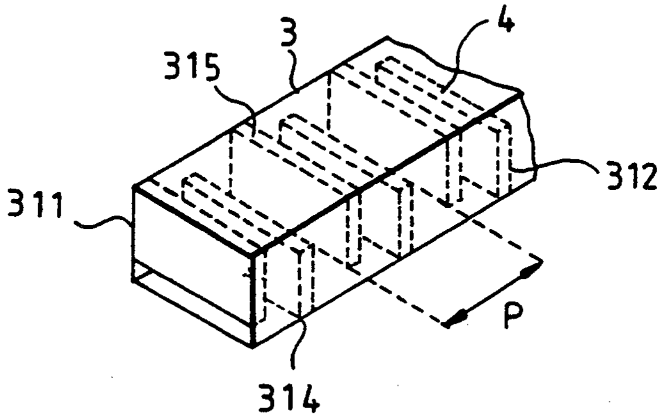
FIG. 1*b* shows an exemplary embodiment of a line with periodic structure.

FIG. 1*a* shows a basic diagram explaining the operation of a device according to the invention. A pulse signal 1, for example a microwave signal, enters a first propagation line 2 with a length $l_1$. At the output of this first propagation line, there is placed a second propagation line 3 with a length $l_2$, having a periodic structure with a period p. An exemplary embodiment of this type of line with periodic structure, called a line in folded waveguide form, is illustrated in FIG. 1*b*. In a propagation line, for example a rectangular-sectioned microwave guide, metal plates 4 are placed in parallel to the section of the line, i.e. perpendicularly to its axis of propagation. These metal plates 4 are fixed alternately by one side 311 and by the other opposite side 312 of the line 3, a space being left between their ends and the side of the line to which they are not fixed. Similarly, these metal plates 4 are fixed to each of the sides 314, 315 adjacent to the above two sides 311, 312. The period p of the structure of the line 3 is, for example, defined by the distance between two successive metal plates 4 fixed in the same way to the line 3.

The device according to the invention uses the property of reflection of the waves possessed by a periodic structure, of the type for example shown in FIG. 1*b*. This reflection, defined notably by the Bragg law or the Brillouin law, occurs when the reflection on each cell, the metal plates 4 for example, of the structure, becomes cumulative in a certain frequency band.

Figure 1C:
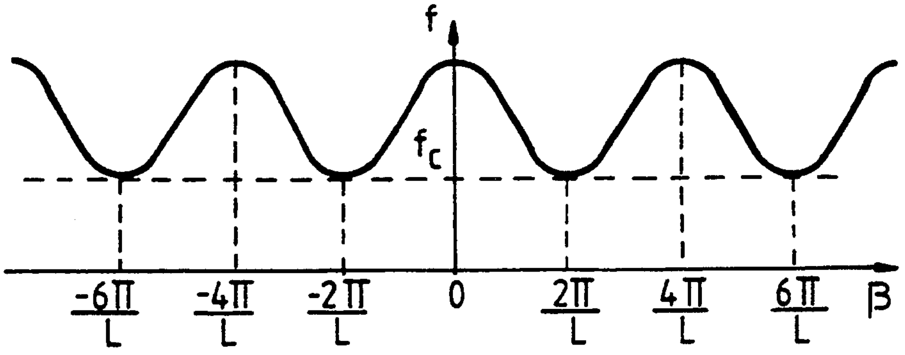
FIG. 1*c* is a graph of frequency of the above-mentioned line.

FIG. 1*c* shows a graph used to illustrate the relationship between the frequency f transmitted through a line with periodic structure such as this and the number of waves $\beta$, equal to $2\pi/\lambda$, of propagation in the structure, $\lambda$ being the wavelength guided in the structure. The graph of FIG. 1*c* defines the pass band of the line. In particular, this pass band is limited towards the low frequencies by a frequency fc constituting a cut-off frequency of the line, when $\beta$ is a multiple of $2\pi/L$ where L is equal to the above-mentioned period p. When the frequency of the signal 1 is lower than the cut-off frequency fc at the input of the device of FIG.

1*a*, the pulse gets reflected at the input 5 of the line 3 with periodic structure. At the output of the first line 2, the reflected pulse 6 is delayed by:

$$\tau = 2\frac{l_1}{v_1}$$

with respect to the instant of its input into this first line, where $l_1$ is the length of the first transmission line 2, with a non-periodic structure for example, and $v_1$ is the speed of propagation of the energy of the signal 1 in this first line. When the frequency of the signal f is higher than the cut-off frequency fc, and lower than the upper cut-off frequency in the case of a graph of the type shown in FIG. 1*c* for example, the line 3 with a periodic structure propagates the signal 1 as represented by dashes 7 in FIG. 1*a*. The line 3 with periodic structure being for example open at the end opposite to that connected to the first line 2, the signal 1 is reflected at this end. At the output of the first line 2, the signal 1 is then delayed by:

$$r = 2\frac{l_1}{v_1} + 2\frac{l_2}{v_2}$$

where l and $v_1$ represent the same variables as above and $l_2{}^l$ and $v_2$ respectively represent the length of the line 3 with periodic structure and the speed of propagation of the energy of the signal 1 in this line.

It it therefore possible in this way to create a different delay according to the frequency of the applied signal.

Figure 2A:
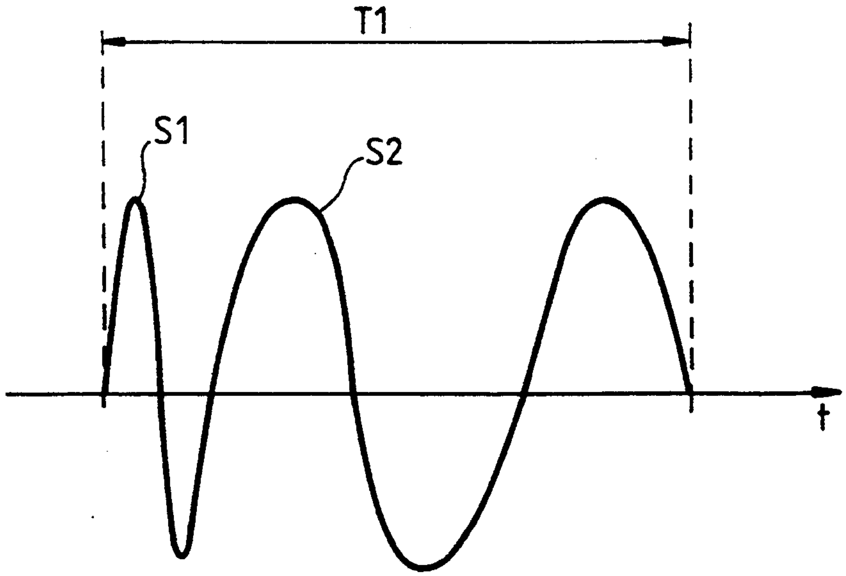
FIG. 2*a* shows a theoretical example of a pulse to be compressed.
Figure 2B:
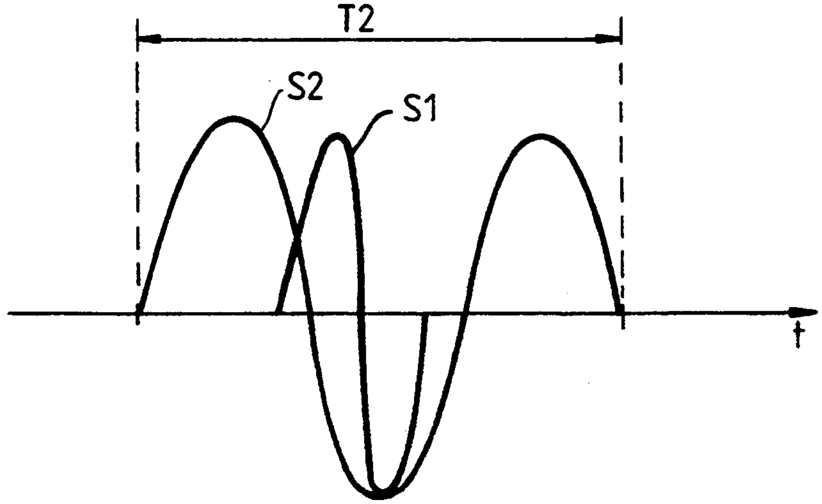
FIG. 2*b* shows the above pulse in a compressed state.

The basic diagram of a device according to the invention, presented by FIG. 1*a*, actually corresponds to a single transmission line having a cut-off frequency that varies in the direction of its axis of propagation. In the example of FIG. 1*a*, this cut-off frequency takes only two values. It is, for example, very low on the length $l_1$ so as to let through all the signals brought into play, and it takes the value fc at the input of the periodic structure. Thus, in a theoretical case illustrated by FIG. 2*a*, where a pulse is modulated so as to contain two successive signals $S_1$ and $S_2$ shown as a function of time t, the signal $S_1$ having a frequency higher than that of the signal $S_2$, it is possible to define a period of the line with periodic structure 3 so as to obtain a cut-off frequency $f_1$ lower than the frequency of the signal $S_1$ but greater than that of the signal $S_2$. Then, given the above-mentioned propagation speeds $v_1$ and $v_2$, it is also possible to define the lengths $l_1$ and $l_2$ also mentioned here above, to delay the signal $S_1$ with respect to the signal $S_2$ so that it is superimposed on the signal $S_2$ at an output of the total line constituted by the lines 2, 3 at different cut-off frequencies as can be seen in FIG. 2*b* where it is not the mixture of the two signals that is shown but only their temporal arrangements. Provided that the line has means (not shown) at its output, for the separation of an incident wave and a reflected wave, a microwave circulator for example, it is possible to recover a pulse at the output of this line, the width $T_2$ of this pulse being reduced in relation to the pulse $T_1$ of the incoming pulse.

Figure 3A:
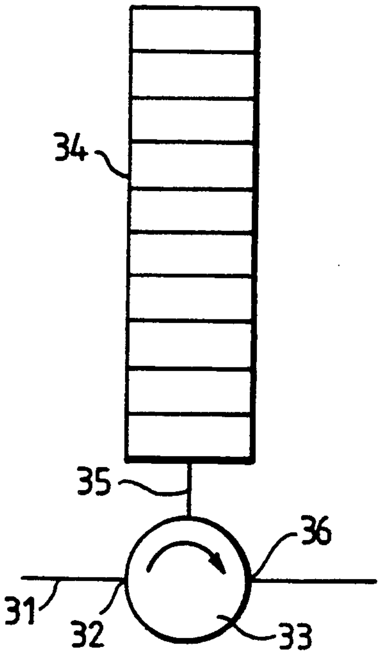
FIG. 3*a* is a block diagram of a first possible embodiment of a device according to the invention.

FIG. 3*a* shows the block diagram of a possible embodiment of a device according to a invention. The pulse to be compressed arrives by a line 31 to the input 32 of the means 33 for the separation of an incident wave and a reflected wave, a microwave circulator for example. The separation means 33 are loaded by a transmission line 34 with a structure similar to that of the line 3 with periodic structure of FIG. 1*a*. The separation means 33 may be loaded by the line 34 by means of a transmission line 35 or else they may have an aperture directly closed by the line 34. The pulses to be compressed may have, for example, a radar recurrence frequency ranging from some kilohertz to some hundreds of kilohertz. These pulses are modulated, for example, by a microwave signal. To make the device according to the invention, the structure of the line 34 and the modulation of the pulses are adapted to the compressing of these pulses. The line 34 connected to the separation means 33 has a structure similar to that of the line 3 of FIG. 1*a*, although not being necessarily periodic. According to the invention, the line 34 has a structure such that its cut-off frequency, which is low for example, varies along its axis of propagation. In this direction, it is similar to the total line of FIG. 1*a*, constituted by the two lines 2, 3 where the variation of the cut-off frequency occurs at the transition of the two lines. In the case of the device of FIG. 3*a*, this variation is adapted to the modulation of the pulses to be compressed. In particular, if this modulation is linear, the variation of the cut-off frequency along the axis of propagation of line 34 is itself also linear.

Figure 3B:
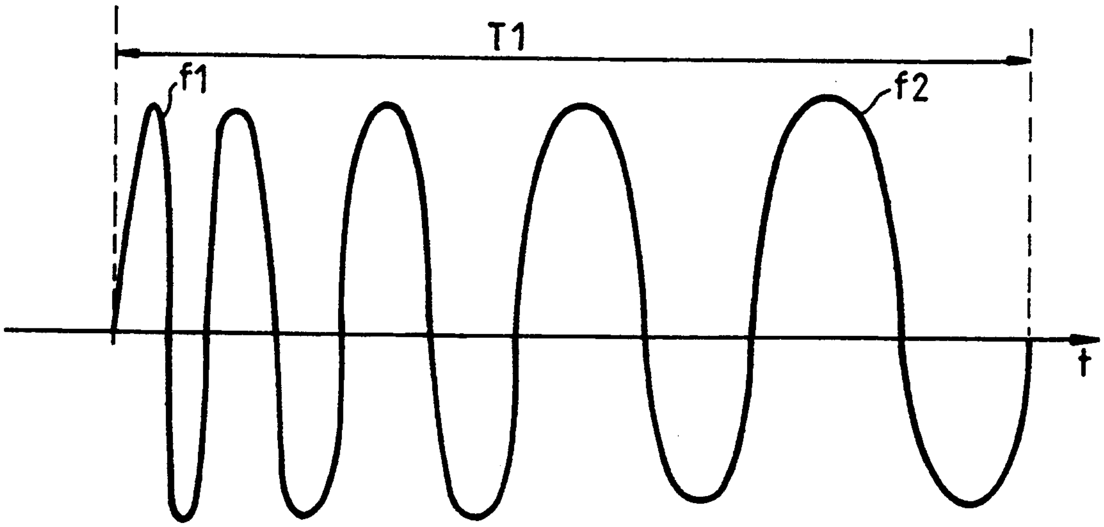
FIG. 3*b* shows an example of a pulse to be compressed.
Figure 3C:
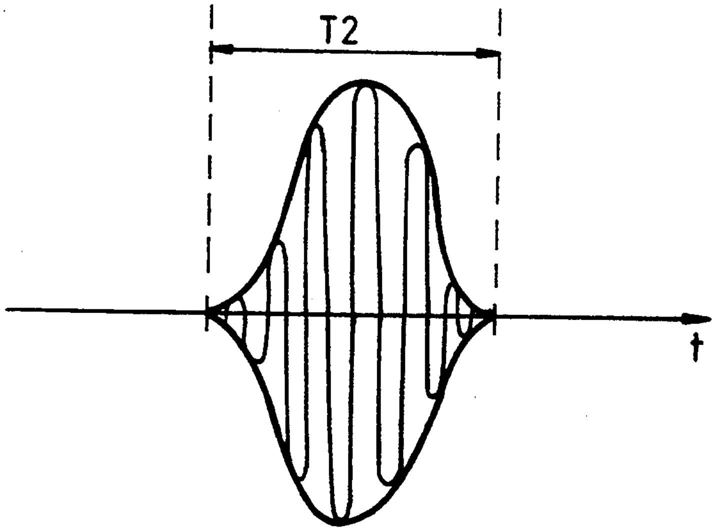
FIG. 3*c* shows the previous pulse compressed.

FIG. 3*b* illustrates a pulse with a duration $T_1$, the modulation of which is linear. At the start of the pulse, the frequency of the signal contained in the pulse is equal to a value $f_1$, the frequency of the following signals varying linearly up to the frequency of the end-of-pulse signal having a value $f_2$, $f_2$ being lower than $f_1$. The low cut-off frequency along the line 34 can therefore vary, for example linearly, from the value $f_2$ at its input end to the value $f_1$ at the other end. The length of the line 34 is, for example, computed so that all the successive signals constituting the pulse to be compressed are superimposed on the last signal with a frequency $f_2$ at the output of the line 34. The law of variation of the cut-off frequency, which is a low frequency for example, along the axis of propagation of the line 34 and the law of modulation of frequency of the pulse to be compressed are therefore matched with each other so that all the successive signals constituting the pulse are, after reflection, in synchronism on the input port side of the line 34. The compressed pulses are then obtained at output 36 of the separation means 33. FIG. 3*c* illustrates a compressed pulse with a duration $T_2$, obtained for example by the compression of the pulse with a duration $T_1$ of FIG. 3*b*. This compressed pulse is constituted by the mixture of the signals having different frequencies, delayed with respect to one another.

In the exemplary embodiment described by FIGS. 3*a*, 3*b* and 3*c*, the cut-off frequencies used are low cut-off frequencies of the pass band developing along the axis of propagation of the line 34. It is possible to use the high cut-off frequencies of this pass band. In this case, the signal to be compressed is modulated in such a way that the frequency of the signals that it contains rises from the start of the pulse instead of falling as in the exemplary embodiment described.

It is not necessary that the frequency modulation of the pulse to be compressed be linear. Nevertheless, a linear modulation facilitates the making of a device according to the invention.

The variation of the cut-off frequency along the axis of the line 34 can be obtained in several ways. In the line with periodic structure, such as the line of FIG. 1*b*, since the cut-off frequency depends on the period or the pitch p between two groups of consecutive and identical metal plates, one approach to varying the cut-off frequency is by varying this pitch p. The line then does not have a properly periodic structure but nevertheless keeps its properties of reflection, the pass band developing with the pitch p. Another approach is, for example, by varying the height or the width of the transmission line 34. Again, in the case of a line of the type shown in FIG. 1*b*, it is possible to vary the geometry of the metal plates 4 while at the same time keeping their periodic arrangement. It is also possible to vary both this arrangement and the geometry of the metal plates 4.

Figure 4:
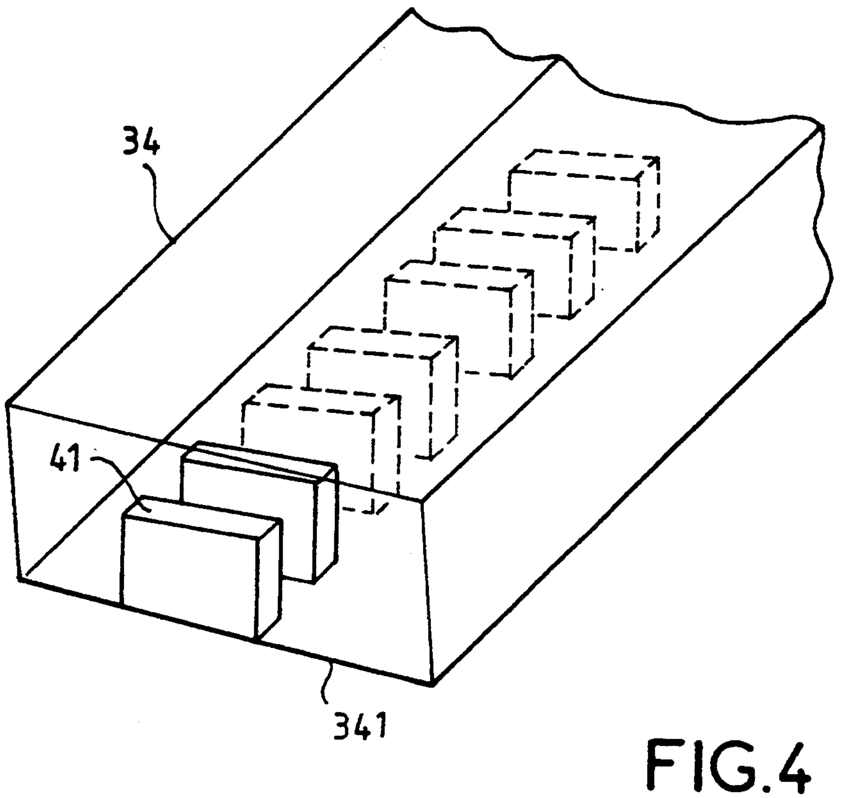
FIG. 4 shows a possible structure for a line used in a device according to the invention.

FIG. 4 shows another embodiment of the transmission line 34 with a variable cut-off frequency. Metal plates or valves 41 are positioned along the line 34, which is a rectangular-sectioned guide for example, perpendicularly to its axis of propagation. The valves 41 are all fixed to the same side 341 of the line and are centered, for example, at the middle of this side. The cut-off frequency along this line can be made to vary by bringing about variations in the pitch between the valves 41 or by bringing about variations in their height. Other embodiments are possible for this line 34. This line can notably be made of a dielectric material whose geometry varies as a function of the axis of propagation of the line.

Figure 5:
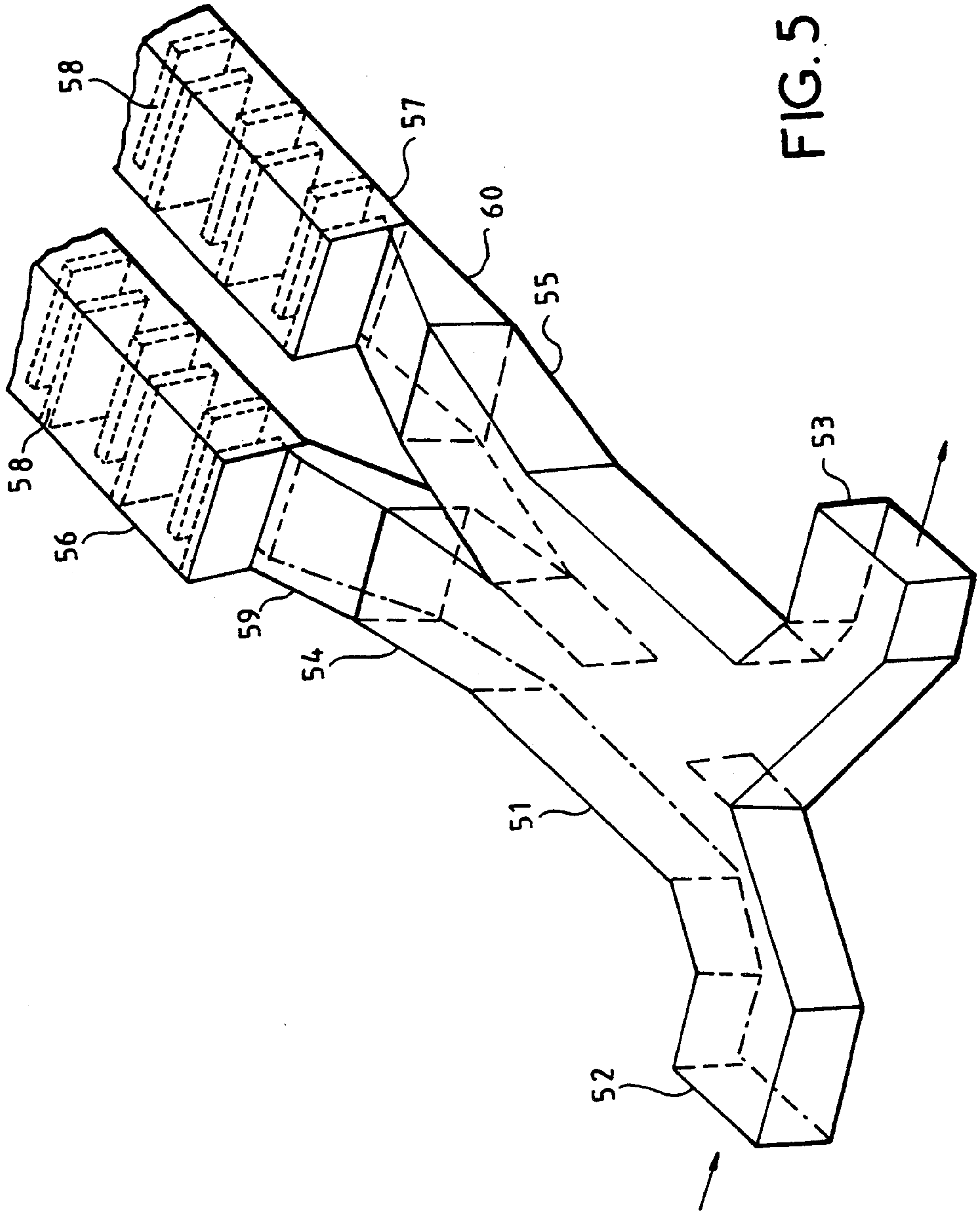
FIG. 5 shows a second possible embodiment of a device according to the invention.

FIG. 5 shows another possible embodiment of a device according to the invention. This is constituted by a 3 dB coupler 51 having an input 52 through which there enter the pulses to be compressed, an output 53 delivering the compressed pulses, and two arms 54, 55 into which there pass the signals entering by the input 52, the signals that pass into each of the arms having the same amplitude, equal to $1/\sqrt{2}$ times half the amplitude of the input signals, thus giving it the name 3 dB coupler, and being in quadrature. The arms 54, 55 of the coupler 51 are each loaded by a line 56, 57, the cut-off frequency of which varies along the axis of propagation. These lines 56, 57 are, for example, similar to those of FIG. 1*b*, but with a variable pitch between the metal plates 58 or with a variable dimension of these plates, these variations being adapted to the modulation of frequency of the pulses to be compressed. These lines could also be similar to those presented in FIG. 4. The arms 54, 55 of the coupler 51 have terminations 59, 60 which enable them to be adapted to the input of the lines 56, 57, because the input section of these lines is reduced by the presence of the metal plates 58. The working of the device of FIG. 5 uses the properties of the coupler 51 and of the lines 56, 57 that are associated with it, the coupler playing the role notably of the means for performing the separation of an incident wave and a reflected wave. A pulse to be compressed enters by the input 52 of the coupler 51 and then gets divided into two pulses in quadrature with equal amplitude, equal to $1/\sqrt{2}$ times half the amplitude of the input pulse, one of the pulses thus created being propagated in an arm 54 and the other pulse being propagated in the other arm 55. Then, they penetrate the lines 56, 57 by means of the terminations 59, 60. These pulses get propagated and reflected inside the lines 56, 57 as described here above with regard to the line 34 of the device of FIG. 3*a*. In particular, if the pulse to be compressed is modulated linearly in frequency, the cut-off frequency varies linearly along the the lines 56, 57 according to the above-described methods. In the case of the device of FIG. 5, the structures of the lines 56, 57 are preferably identical. After reflection in these lines 56, 57, their structure having been adapted to the frequency modulation of the pulse entering the coupler 51 in order to compress it similarly, for example, to the line 34 of the device of FIG. 3*a*, the two pulses present at the output of the arms are compressed. The pulse coming from an arm 54 gets divided into two pulses in quadrature having equal amplitudes, one returning towards the input 52 of the coupler and the other getting propagated towards the output 53 of the coupler. Similarly, the pulse coming from the other arm 55 gets divided in the same way. Since the two pulses initially have equal amplitudes and are in quadrature, the pulses getting propagated towards the input 52 are in phase opposition and have the same amplitude and therefore cancel each other out while the pulses getting propagated towards the output 53 of the coupler, which are in phase, get recombined to constitute the initial compressed pulse.

The device of FIG. 5 makes it possible, notably through the coupler, to compress high power pulses and can therefore advantageously be used for the compression of pulses in microwave transmission in radar applications for example.

The exemplary devices presented are applicable to electromagnetic microwaves, but their principle can be applied to other types of waves.

What is claimed is:

1. A pulse compression device, comprising:

means for inputting a signal having frequency-modulated pulses to be compressed;

a rectangular-sectioned waveguide including a plurality of metal plates spaced apart at a predetermined pitch for delaying said pulses of said signal for different amounts of time by varying the cut-off frequency of said waveguide such that said pulses are output in an overlapping manner so that said signal is compressed, wherein the variation of said cut-off frequency of said waveguide matches the frequency modulation of said pulses of said signal; and means for receiving said signal and for supplying said frequency modulated pulses of said signal to said waveguide, wherein said metal plates are grouped into pairs and one plate of each pair is connected to first and second adjacent sides of said waveguide and the other plate of each pair is connected to third and fourth adjacent sides of said waveguide, and for each plate, a space exists between an end of the plate and a wall of said waveguide.

2. A pulse compression device, comprising:

means for inputting a signal having frequency-modulated pulses to be compressed;

a rectangular-sectioned waveguide including a plurality of metal plates spaced apart at a predetermined pitch for delaying said pulses of said signal for different amounts of time by varying the cut-off frequency of said waveguide such that said pulses are output in an overlapping manner so that said signal is compressed, wherein the variation of said cut-off frequency of said waveguide matches the frequency modulation of said pulses of said signal; and means for receiving said signal and for supplying said frequency modulated pulses of said signal to said waveguide, wherein said pulses are frequency modulated in a linear manner.

3. A pulse compression device, comprising:

means for inputting a signal having frequency-modulated pulses to be compressed;

a rectangular-sectioned waveguide including a plurality of metal plates spaced apart at a predetermined pitch for delaying said pulses of said signal for different amounts of time by varying the cut-off frequency of said waveguide such that said pulses are output in an overlapping manner so that said signal is compressed, wherein the variation of said cut-off frequency of said waveguide matches the frequency modulation of said pulses of said signal; and means for receiving said signal and for supplying said frequency modulated pulses of said signal to said waveguide, wherein the variation of the cut-off frequency of said waveguide is varied along the axis of propagation of said signal along said waveguide.

4. A pulse compression device, comprising:

means for inputting a signal having frequency-modulated pulses to be compressed;

a rectangular-sectioned waveguide including a plurality of metal plates spaced apart at a predetermined pitch for delaying said pulses of said signal for different amounts of time by varying the cut-off frequency of said waveguide such that said pulses are output in an overlapping manner so that said signal is compressed, wherein the variation of said cut-off frequency of said waveguide matches the frequency modulation of said pulses of said signal; and means for receiving said signal and for supplying said frequency modulated pulses of said signal to said waveguide, wherein said variation of the cut-off frequency of said waveguide is obtained by varying the distance between said metal plates of said waveguide.

5. A pulse compression device, comprising:

means for inputting a signal having frequency-modulated pulses to be compressed;

a rectangular-sectioned waveguide including a plurality of metal plates spaced apart at a predetermined pitch for delaying said pulses of said signal for different amounts of time by varying the cut-off frequency of said waveguide such that said pulses are output in an overlapping manner so that said signal is compressed, wherein the variation of said cut-off frequency of said waveguide matches the frequency modulation of said pulses of said signal; and means for receiving said signal and for supplying said frequency modulated pulses of said signal to said waveguide, wherein the variation of the cut-off frequency of the waveguide is obtained by varying the geometry of said metal plates of said waveguide.

6. A pulse compression device, comprising:

means for inputting a signal having frequency-modulated pulses to be compressed;

a rectangular-sectioned waveguide including a plurality of metal plates spaced apart at a predetermined pitch for delaying said pulses of said signal for different amounts of time by varying the cut-off frequency of said waveguide such that said pulses are output in an overlapping manner so that said signal is compressed, wherein the variation of said cut-off frequency of said waveguide matches the frequency modulation of said pulses of said signal; and means for receiving said signal and for supplying said frequency modulated pulses of said signal to said waveguide, wherein the variation of the cut-off frequency of the waveguide is obtained by varying at least one dimension of said waveguide.

7. The device according to any one of claims 1–6, wherein said receiving means comprise a microwave circulator.

8. The device according to any one of claims 1–6, wherein the means for receiving said signal comprise a coupler having two arms each including a waveguide, and the cut-off frequency of each waveguide varies along the axis of propagation of said signal along said waveguides.

9. The device according to claim 2, wherein the cut-off frequencies of said waveguide are varied in a linear manner.

* * * * *